United States Patent
Yoon et al.

(10) Patent No.: US 6,465,946 B1
(45) Date of Patent: Oct. 15, 2002

(54) GREEN-EMITTING PHOSPHOR COMPOSITION AND CATHODE RAY TUBE MANUFACTURED USING THE SAME

(75) Inventors: Won-ho Yoon, Suwon; Joa-young Jeong, Sungnam; Gyeong-jae Heo, Anyang, all of (KR)

(73) Assignee: Samsung SDI Co., Ltd., Kyungki-Do (KR)

( * ) Notice: Subject to any disclaimer, the term of this patent is extended or adjusted under 35 U.S.C. 154(b) by 0 days.

(21) Appl. No.: 09/549,163

(22) Filed: Apr. 13, 2000

(30) Foreign Application Priority Data

Apr. 14, 1999 (KR) .............................. 99-13146
Jun. 30, 1999 (KR) .............................. 99-25807

(51) Int. Cl.⁷ .............................................. C09K 11/46
(52) U.S. Cl. .................................. 313/467; 252/301.65
(58) Field of Search .................... 313/446, 467, 313/1, 493; 252/301.63, 301.45, 301.6 R

(56) References Cited

U.S. PATENT DOCUMENTS

| | | | |
|---|---|---|---|
| 4,119,562 A | | 10/1978 | Kagami et al. |
| 4,208,613 A | | 6/1980 | Hase et al. |
| 6,090,200 A | * | 7/2000 | Gray et al. ................ 117/68 |
| 6,193,908 B1 | * | 2/2001 | Hampden-Smith et al. ...... 252/301.4 R |

* cited by examiner

*Primary Examiner*—Vip Patel
*Assistant Examiner*—Ken A Berck
(74) *Attorney, Agent, or Firm*—Lowe Hauptman Gilman & Berner, LLP

(57) ABSTRACT

A green-emitting phosphor composition and a cathode ray tube (CRT) manufactured using the same are provided. The composition including 5 to 50 wt % of a $SrGa_2S_4$:Eu phosphor and 50 to 95 wt % of a $Y_2(Al, Ga)_5O_{12}$:Tb phosphor has excellent luminance, degradation and afterglow characteristics so that it can be advantageously used for manufacturing projection type CRTs.

6 Claims, No Drawings

GREEN-EMITTING PHOSPHOR COMPOSITION AND CATHODE RAY TUBE MANUFACTURED USING THE SAME

BACKGROUND OF THE INVENTION

1. Field of the Invention

The present invention relates to a green-emitting phosphor composition and a cathode ray tube (CRT) manufactured using the same, and more particularly, to a green-emitting phosphor composition having improved luminance characteristics, degradation characteristics and afterglow characteristics, and a CRT adopting the same.

2. Description of the Related Art

Recently, with the advent of HDTV (high definition television) broadcasting, demands for projection type CRTs which can attain 40-inch or larger screens have been increasing for both home and business purposes. In the case of a projection type CRT, the fluorescent screen of a projection type CRT requires a brightness of several to several tens of times that of a direct viewing type CRT because an image is projected onto a 40 inch, 50 inch or larger screen. Thus, the fluorescent screen of a projection type CRT should be excited under the condition in which a high-density current of several to several tens of times that of a direct viewing type CRT is applied. However, this results in deterioration of luminance, which is particularly serious in green-emitting phosphors which contribute to about 70% of the luminance.

As components of the conventional green-emitting phosphor, $Y_3Al_5O_{12}$:Tb, $Y_3(Al, Ga)_5O_{12}$:Tb, LaOCl:Tb, $Zn_2SiO_4$:Mn, $InBO_3$:Tb or $Y_2SiO_5$:Tb, which have improved characteristics compared to $Y_2O_2S$:Tb, $Gd_2O_2S$:Tb or ZnS:Cu, Al, are used alone. However, these single-substance green-emitting phosphors do not fulfil all characteristics required for a projection type CRT. Thus, mixed green-emitting phosphors obtained by mixing $Zn_2SiO_4$:Mn or $InBO_3$:Tb with $Y_3(Al, Ga)_5O_{12}$:Tb, $Y_2SiO_5$:Tb or pigment-attached $Y_3(Al, Ga)_5O_{12}$:Tb in an appropriate mixture ratio are put into practical use.

For example, Japanese Patent Laid-Open Publication No. hei 4-161483 describes a mixed green-emitting phosphor obtained by mixing $Y_3(Al, Ga)_5O_{12}$:Tb with $Zn_2SiO_4$:Mn in order to improve color purity. U.S. Pat. No. 4,559,469 describes a mixed green-emitting phosphor obtained by mixing $Zn_2SiO_5$:Mn with $Y_2SiO_5$:Tb in order to improve color purity.

However, the $Zn_2SiO_4$:Mn phosphor used for improving color purity has poor degradation, luminance and afterglow characteristics under the condition in which a high-density current is applied, while exhibiting excellent color purity. Thus, the $Zn_2SiO_4$:Mn phosphor mixed for improving color purity considerably deteriorates luminance and degradation characteristics of the mixed green-emitting phosphor.

SUMMARY OF THE INVENTION

To solve the above problems, it is an object of the present invention to provide a new green-emitting phosphor composition which can replace a conventional green-emitting phosphor composition containing a $Zn_2SiO_4$:Mn phosphor.

It is another object of the present invention to provide a cathode ray tube (CRT) manufacturing method using the new green-emitting phosphor composition.

Accordingly, to achieve the first object, there is provided a green-emitting phosphor composition including 5 to 50 wt % of a $SrGa_2S_4$:Eu phosphor and 50 to 95 wt % of a $Y_2(Al, Ga)_5O_{12}$:Tb phosphor.

According to another aspect of the present invention, there is provided a green-emitting phosphor composition including 5 to 20 wt % of a $SrGa_2S_4$:Eu phosphor, 60 to 90 wt % of a $Y_2(Al, Ga)_5O_{12}$:Tb phosphor and 5 to 20 wt % of a LaOCl:Tb phosphor.

To achieve the second object, there is provided a cathode ray tube manufactured using the green-emitting phosphor composition.

DETAILED DESCRIPTION OF THE INVENTION

A mixed green-emitting phosphor composition comprising a mixture of a $SrGa_2S_4$:Eu phosphor and a $Y_3(Al, Ga)_5O_{12}$:Tb phosphor or a mixture of a $SrGa_2S_4$:Eu phosphor, a $Y_3(Al, Ga)_5O_{12}$:Tb phosphor and a LaOCl:Tb phosphor according to the present invention has excellent luminance, afterglow and degradation characteristics under the condition in which a high-density current is applied, so that it is capable of replacing a conventional green-emitting phosphor composition comprising a mixture of a $Zn_2SiO_4$:Mn phosphor, $Y_3(Al, Ga)_5O_{12}$:Tb phosphor and/or a LaOCl:Tb phosphor.

That is to say, since the $Y_3(Al, Ga)_5O_{12}$:Tb phosphor has poor color purity while exhibiting excellent luminance saturation characteristic and excellent degradation characteristic under high-voltage and high-current conditions, it is used in a mixture with a $Zn_2SiO_4$:Mn phosphor having good color purity. However, the $Zn_2SiO_5$:Mn phosphor has a very long afterglow time, that is, about 30 ms, and is poorest in view of luminance and degradation characteristics among single-substance phosphors for a projection type CRT. Therefore, the green-emitting phosphor compositions according to the present invention have improved luminance, degradation and afterglow characteristics by replacing a $Zn_2SiO_4$:Mn phosphor contained in the conventional green-emitting phosphor composition comprising the $Zn_2SiO_4$:Mn phosphor, a $Y_3(Al, Ga)_5O_{12}$:Tb phosphor and/or a LaOCl:Tb phosphor, with a $SrGa_2S_4$:Eu phosphor having excellent luminance and degradation characteristics and a short afterglow time, that is, about 300 µs.

First, a method of manufacturing a $SrGa_2S_4$:Eu phosphor of the present invention will be described in detail.

0.5 to 1.5 mol of a strontium salt such as strontium carbonate or strontium sulfate, 1.5 to 2.5 mol of a gallium salt such as gallium oxide or gallium sulfate and 0.001 to 0.05 mol of europium oxide are mixed and then an appropriate amount of a solvent such as sodium bromide, ammonium chloride or sodium chloride is mixed therewith. Subsequently, the mixture is put into an alumina vessel and then fired at 700 to 900° C. under a hydrogen sulfide gas atmosphere for 1 to 4 hours. Then, the resultant material is cooled, washed, dried and sieved to obtain a $SrGa_2S_4$:Eu phosphor.

After screen layers are manufactured using a $SrGa_2S_4$:Tb phosphor prepared in the above-described manner and prior art $Y_3(Al, Ga)_5O_{12}$:Tb phosphor, a LaOCl:Tb phosphor and a $Zn_2SiO_4$:Mn phosphor by sedimentation, the emission characteristics are evaluated using a demountable system BM-7 and the evaluation result is described in the following Table 1. The evaluation conditions are an acceleration voltage of 20 kV, a driving current $I_k$ of 60 µA, a raster size of 2.0 cm×2.0 cm and a degradation evaluation time of 600 seconds.

TABLE 1

| Kind of phosphor | Luminance[1] (%) | Color coordinate (x/y) | Luminance persistence ratio (%) |
|---|---|---|---|
| $Y_3(Al, Ga)_5O_{12}$: Tb | 100 | 3550/5550 | 97.0 |
| LaOCl: Tb | 90 | 3250/5800 | 88.5 |
| $SrGa_2S_4$: Tb | 120 | 2677/6900 | 64.0 |
| $Zn_2SiO_4$: Mn | 80 | 2100/7000 | 35.0 |

In Table 1, Luminance[1] represents a relative luminance when the luminance of the $Y_3(Al, Ga)_5O_{12}$:Tb phosphor is set to 100%.

Referring to Table 1, under high voltage and high current conditions, the $Y_3(Al, Ga)_5O_{12}$:Tb phosphor exhibits an excellent luminance characteristic, specifically an excellent degradation characteristic, while exhibiting considerably poor color purity. Thus, the $Y_3(Al, Ga)_5O_{12}$:Tb phosphor has been conventionally used in a mixture with a $Zn_2SiO_4$:Mn phosphor having excellent color purity. However, the $Zn_2SiO_4$:Mn phosphor is very poor in view of luminance and degradation characteristics. On the other hand, a $SrGa_2S_4$:Eu phosphor is excellent in view of color purity and luminance characteristics and is relatively superior in view of degradation characteristics than the $Zn_2SiO_4$:Mn phosphor, and thus a mixed green-emitting phosphor composition thereof exhibits excellent luminosity characteristics. However, the degradation characteristics of the $SrGa_2S_4$:Eu phosphor are lower than those of the $Y_3(Al, Ga)_4O_{12}$:Tb phosphor. Thus, the present invention provides a mixed phosphor composition of 5 to 50% by weight of a $SrGa_2S_4$:Eu phosphor and 50 to 95% by weight of a $Y_3(Al, Ga)_4O_{12}$:Tb phosphor, for suppressing degradation characteristic of the phosphor composition from being greatly lowered. Here, the contents of the $SrGa_2S_4$:Eu phosphor and the $Y_3(Al, Ga)_4O_{12}$:Tb phosphor are preferably 7 to 20% by weight and 80 to 93% by weight, respectively.

Also, the present invention provides a phosphor composition further including a LaOCl:Tb phosphor having relatively excellent luminosity characteristics, in addition to the mixed phosphor composition of $SrGa_2S_4$:Eu phosphor and $Y_3(Al, Ga)_4O_{12}$:Tb phosphor, thereby improving the color purity of the $Y_3(Al, Ga)_4O_{12}$:Tb phosphor and the degradation characteristics of the $SrGa_2S_4$:Eu phosphor.

Based on data shown in Table 1, a conventional mixed green-emitting phosphor containing a $Zn_2SiO_4$:Mn phosphor and a mixed green-emitting phosphor composition consisting of a $Y_3(Al, Ga)_4O_{12}$:Tb phosphor, a LaOCl:Tb phosphor and a $SrGa_2S_4$:Eu phosphor are prepared, and then luminosity characteristics thereof are evaluated under the same conditions as listed in Table 1. The evaluation results are shown in Table 2.

TABLE 2

| Mixed phosphor | Phosphor composition (wt %) | | | | Luminance[1] (%) | Color coordinate (x/y) | Luminance persistence ratio (%) |
|---|---|---|---|---|---|---|---|
| | A | B | C | D | | | |
| 1 | 93 | — | 7 | — | 100 | 0.342/0.567 | 0.945 |
| 2 | 70 | 25 | 5 | — | 105 | 0.332/0.567 | 0.945 |
| 3 | 70 | 25 | — | 5 | 107 | 0.345/0.564 | 0.950 |

(A: $Y_3(Al, Ga)_4O_{12}$: Tb;
B: LaOCl: Tb;
C: $Zn_2SiO_4$: Mn;
D: $SrGa_2S_4$: Eu)

In Table 2, Luminance[1] represents a relative luminance when the luminance of the mixed phosphor 1 is assigned to 100%, and the mixed phosphors 1 and 2 are obtained in a composition ratio which is generally known as the best mixture ratio in view of luminosity characteristics including color purity, luminance and degradation characteristics.

Referring to Table 2, the mixed green-emitting phosphor containing $SrGa_2S_4$:Eu has improved luminance and degradation characteristics compared to the mixed green-emitting phosphor containing the $Zn_2SiO_4$:Mn phosphor. In particular, when the mixed phosphor 2 and the mixed phosphor 3 each containing the $Y_3(Al, Ga)_4O_{12}$:Tb phosphor and the LaOCl:Tb phosphor are compared, the mixed phosphor 3 further containing the $SrGa_2S_4$:Eu phosphor is better than the mixed phosphor 2 further containing the $Zn_2SiO_4$:Mn phosphor, the $SrGa_2S_4$:Eu phosphor and the $Zn_2SiO_4$:Mn phosphor being contained in the same percent by weight. However, the mixed phosphor 3 has poor color purity compared to the other mixed phosphors, while having an acceptable color coordinate to be used as a green-emitting phosphor. Thus, in order to improve the color purity, it is preferable to increase the content of the $SrGa_2S_4$:Eu phosphor within the limit in which the degradation characteristic are not lowered considerably.

Therefore, in the present invention, there is provided a mixed green-emitting phosphor having an excellent luminosity characteristics by replacing a $Zn_2SiO_4$:Mn phosphor having poor luminance and degradation characteristics with a $SrGa_2S_4$:Eu phosphor having excellent color purity, luminance and degradation characteristics, and mixing a $Y_3(Al, Ga)_4O_{12}$:Tb phosphor and a LaOCl:Tb phosphor in a desirable composition ratio.

In the green-emitting phosphor composition consisting of a $SrGa_2S_4$:Eu phosphor, a $Y_3(Al, Ga)_4O_{12}$:Tb phosphor and a LaOCl:Tb phosphor according to the present invention, the content of the $SrGa_2S_4$:Eu phosphor is preferably 5 to 20% by weight, and more preferably 10 to 15% by weight, in view of color purity, luminance and degradation characteristics.

Also, in the green-emitting phosphor composition consisting of a $SrGa_2S_4$:Eu phosphor, a $Y_3(Al, Ga)_4O_{12}$:Tb phosphor and a LaOCl:Tb phosphor according to the present invention, the content of the $Y_3(Al, Ga)_4O_{12}$:Tb phosphor is preferably 60 to 90% by weight, and more preferably 70 to 85% by weight, for improving color purity while maintaining excellent degradation characteristics.

Further, in the green-emitting phosphor composition consisting of a $SrGa_2S_4$:Eu phosphor, a $Y_3(Al, Ga)_4O_{12}$:Tb phosphor and a LaOCl:Tb phosphor according to the present invention, the content of the LaOCl:Tb phosphor is preferably 5 to 20% by weight, and more preferably 5 to 15% by weight, in view of color purity, luminance and degradation characteristics.

Hereinbelow, the present invention is described more concretely with reference to specific examples intended to illustrate the invention without limiting the scope thereof.

EXAMPLE 1

93 wt % of a P53(Ga) phosphor and 7 wt % of a SrGa$_2$S$_4$:Eu phosphor were dry-mixed. The mixture was dispersed in a 0.1% K$_2$SiO$_3$ solution and mixed sufficiently. The dispersed mixture was added to a Ba(NO$_3$)$_2$ solution and a glass panel was put thereinto to then form a screen layer consisting of the mixture on the glass panel by sedimentation. The quantity of the mixed phosphor was adjusted so that the thickness of the screen layer corresponds to a layer weight of 5 mg/cm$^2$. After the screen layer has been coated with a lacquer film that can be evaporated by baking, a thin Al film was applied by vapor deposition. Finally, the resultant screen layer was baked.

The relative luminance, color coordinates, afterglow time and degradation characteristics of the screen layer were evaluated using a PTE-demountable system, and the result is described in the following Table 3. In this example, Examples 2 through 4 and Comparative Examples 1 and 2, the relative luminance is calculated on the assumption that the luminance measured for a screen layer formed using the mixed green-emitting phosphor composition consisting of 93 wt % of a P53(Ga) and 7 wt % of a Zn$_2$SiO$_4$:Mn phosphor, is 100%.

EXAMPLE 2

A screen layer was manufactured in the same manner as described in Example 1, except that 90 wt % of a P53(Ga) phosphor and 10 wt % of a SrGa$_2$S$_4$:Eu phosphor were used. The relative luminance, color coordinates, afterglow time and degradation characteristic were evaluated on the thus-manufactured screen layer, and the result is described in the following Table 3.

EXAMPLE 3

A screen layer was manufactured in the same manner as described in Example 1, except that 85 wt % of a P53(Ga) phosphor and 15 wt % of a SrGa$_2$S$_4$:Eu phosphor were used. The relative luminance, color coordinates, afterglow time and degradation characteristics were evaluated on the thus-manufactured screen layer, and the result is described in the following Table 3.

EXAMPLE 4

A screen layer was manufactured in the same manner as described in Example 1, except that 80 wt % of a P53(Ga) phosphor and 20 wt % of a SrGa$_2$S$_4$:Eu phosphor were used. The relative luminance, color coordinates, afterglow time and degradation characteristics were evaluated on the thus-manufactured screen layer, and the result is described in the following Table 3.

Comparative Example 1

A screen layer was manufactured in the same manner as described in Example 1, except that only a P53(Ga) phosphor was used, instead of P53(Ga) phosphor and SrGa$_2$S$_4$:Eu phosphor. The relative luminance, color coordinates, afterglow time and degradation characteristics were evaluated on the thus-manufactured screen layer, and the result is described in the following Table 3.

Comparative Example 2

A screen layer was manufactured in the same manner as described in Example 1, except that 93 wt % of a P53(Ga) phosphor and 7 wt % of a Zn$_2$SiO$_4$:Mn phosphor were used. The relative luminance, color coordinates, afterglow time and degradation characteristic were evaluated on the thus-manufactured screen layer, and the result is described in the following Table 3.

TABLE 3

| | Phosphor composition (wt %) | | | Luminance[1] | Color coordinate | | Degradation[2] (Relative |
|---|---|---|---|---|---|---|---|
| | E | F | G | (%) | x | y | comparison) |
| Example 1 | 93 | 7 | — | 105 | 0.336 | 0.580 | ○ |
| Example 2 | 90 | 10 | — | 103 | 0.330 | 0.588 | ◎ |
| Example 3 | 85 | 15 | — | 102 | 0.325 | 0.590 | ◎ |
| Example 4 | 80 | 20 | — | 100 | 0.322 | 0.594 | ○ |
| Comparative example 1 | 100 | — | — | 105 | 0.350 | 0.550 | ○ |
| Comparative example 2 | 93 | — | 7 | 100 | 0.334 | 0.580 | Δ |

(E: P53(G) phosphor;
F: SrGa$_2$S$_4$: Eu phosphor;
G: Zn$_2$SiO$_5$: Tb phosphor;
Δ: Fair;
○: Good;
◎: Excellent)

In Table 3, Luminance[1] represents a relative luminance when the luminance of Comparative example 2 is set to 100.

Referring to Table 3, a mixed phosphor of Example 1, consisting of 93% by weight of P53(Ga) phosphor and 7% by weight of SrGa$_2$S$_4$:Eu phosphor, has an excellent luminance characteristics, that is, 105%, compared to a mixed phosphor of Comparative Example 2, consisting of 93% by weight of P53(Ga) phosphor and 7% by weight of Zn$_2$SiO$_4$:Mn phosphor. As the content of the SrGa$_2$S$_4$:Eu phosphor increases (Examples 2 through 4), the luminance decreases. When the content of the SrGa$_2$S$_4$:Eu phosphor is 20% by weight, the luminance of the mixed phosphor is the same as that of Comparative example 2. Thus, the SrGa$_2$S$_4$:Eu phosphor content exceeding 20% by weight is not desirable, in view of luminance.

The mixed phosphors of Examples 1 through 4 are substantially the same value in both x and y coordinates, like the conventional mixed phosphor of Comparative example 2. Thus, the mixed phosphors of Examples 1 through 4 have acceptable color coordinates to be used as green-emitting phosphors. In the case of using only the P53(Ga) phosphor, the x-coordinate is 0.350 and the y-coordinate is 0.550, which are beyond the tolerance range of the color coordinate requirement for a green-emitting phosphor.

In the mixed phosphor of Example 1, the afterglow time is reduced as the content of the SrGa$_2$S$_4$:Eu phosphor increases. Thus, if the screen layer is formed using the mixed phosphor of Example 1, the afterglow time is short, which is advantageous in view of afterglow characteristics. Also, as the content of SrGa$_2$S$_4$:Eu phosphor increases (Examples 1 through 4), the afterglow time is further reduced. Thus, in consideration of only the afterglow characteristics, it is preferable to increase the content of the SrGa$_2$S$_4$:Eu phosphor.

Finally, in view of a degradation characteristic, the phosphor compositions of Examples 1 through 4 undergo little degradation in luminance compared to the conventional phosphor composition of Comparative example 2.

As described above, the SrGa$_2$S$_4$:Eu phosphor according to the present invention has excellent luminance, afterglow and degradation (life) characteristics under the condition in which a high-density current is applied, thereby replacing the conventional $Zn_2SiO_4$:Mn phosphor contained in a mixed green-emitting phosphor. In other words, a mixed green-emitting phosphor consisting of a P53(Ga) phosphor and a $SrGa_2S_4$:Eu phosphor has excellent luminance, afterglow and degradation characteristics compared to the conventional mixed green-emitting phosphor consisting of a P53(Ga) phosphor and a $Zn_2SiO_4$:Mn phosphor.

EXAMPLE 5

75 wt % of a $Y_3(Al, Ga)_5O_{12}$:Tb phosphor, 15 wt % of a LaOCl:Tb phosphor and 10 wt % of a $SrGa_2S_4$:Eu phosphor were dry-mixed. The mixture was dispersed in a 0.1% $K_2SiO_3$ solution and mixed thoroughly. The dispersed mixture was added to a $Ba(NO_3)_2$ solution and a glass panel was put thereinto to then form a screen layer consisting of the mixture on the glass panel by sedimentation. The quantity of the mixed phosphor was adjusted so that the thickness of the screen layer corresponds to a layer weight of 5 mg/cm$^2$. After the screen layer was coated with a lacquer film that can be evaporated by baking, a thin Al film was applied by vapor deposition. Finally, the resultant screen layer was baked.

The relative luminance, color coordinates, afterglow time and degradation characteristic of the screen layer were evaluated using a BM-7 demountable system, and the result is described in the following Table 4. The evaluation conditions were: an acceleration voltage of 20 kV, a driving current $I_k$ of 60 µA, a raster size of 2.0 cm×2.0 cm and a degradation evaluation time of 600 seconds.

EXAMPLE 6

A screen layer was manufactured in the same manner as described in Example 5, except that 70 wt % of a $Y_3(Al, Ga)_5O_{12}$:Tb phosphor, 15 wt % of a LaOCl:Tb phosphor and 15 wt % of a $SrGa_2S_4$:Eu phosphor were used. The relative luminance, color coordinates and luminance persistence ratio were evaluated on the thus-manufactured screen layer, and the result is described in the following Table 4.

EXAMPLE 7

A screen layer was manufactured in the same manner as described in Example 5, except that 85 wt % of a $Y_3(Al, Ga)_5O_{12}$:Tb phosphor, 5 wt % of a LaOCl:Tb phosphor and 10 wt % of a $SrGa_2S_4$:Eu phosphor were used. The relative luminance, color coordinates and luminance persistence ratio were evaluated on the thus-manufactured screen layer, and the result is described in the following Table 4.

Comparative Example 3

It is known that the best luminosity characteristics are exhibited when the conventional green-emitting phosphor composition consisting of a $Y_3(Al, Ga)_5O_{12}$:Tb phosphor and a $Zn_2SiO_4$:Mn phosphor are mixed in a composition ratio of 93:7 by weight percent. Thus, a screen layer was manufactured in the same manner as described in Example 5, except that 93 wt % of a $Y_3(Al, Ga)_5O_{12}$:Tb phosphor and 7 wt % of a $Zn_2SiO_4$:Mn phosphor were used. The relative luminance, color coordinates and luminance persistence ratio were evaluated on the thus-manufactured screen layer, and the result is described in the following Table 4.

Comparative Example 4

It is known that the best luminosity characteristics are exhibited when the conventional green-emitting phosphor composition consisting of a $Y_3(Al, Ga)_5O_{12}$:Tb phosphor, a LaOCl:Tb phosphor and a $Zn_2SiO_4$:Mn phosphor are mixed in a composition ratio of 70:25:5 by weight percent. Thus, a screen layer was manufactured in the same manner as described in Example 5, except that 70 wt % of a $Y_3(Al, Ga)_5O_{12}$:Tb phosphor, 25 wt % of a LaOCl:Tb phosphor and 5 wt % of a $Zn_2SiO_4$:Mn phosphor were used. The relative luminance, color coordinates and luminance persistence ratio were evaluated on the thus-manufactured screen layer, and the result is described in the following Table 4.

Comparative Examples 5 Through 7

A screen layer was manufactured in the same manner as described in Example 5, except that the contents of a $Y_3(Al, Ga)_5O_{12}$:Tb phosphor, a LaOCl:Tb phosphor and a $Zn_2SiO_4$:Mn phosphor were changed as shown in Table 4. The relative luminance, color coordinates and luminance persistence ratio were evaluated on the thus-manufactured screen layer, and the result is described in the following Table 4.

TABLE 4

| | Phosphor composition (wt %) | | | | Luminance[1] | Color coordinate | | Luminance persistent ratio |
|---|---|---|---|---|---|---|---|---|
| | H | I | J | K | (%) | x | y | (%) |
| Example 5 | 75 | 15 | — | 10 | 110 | 0.330 | 0.575 | 93.6 |
| Example 6 | 70 | 15 | — | 15 | 110 | 0.325 | 0.590 | 90.5 |
| Example 7 | 85 | 5 | — | 10 | 113 | 0.334 | 0.570 | 94.3 |
| Comparative Example 3 | 93 | — | 7 | — | 100 | 0.332 | 0.567 | 94.5 |
| Comparative Example 4 | 70 | 25 | 5 | | 105 | 0.332 | 0.567 | 94.5 |
| Comparative Example 5 | 65 | 10 | — | 25 | 113 | 0.302 | 0.599 | 86.2 |
| Comparative Example 6 | 65 | 25 | — | 10 | 105 | 0.320 | 0.585 | 930 |
| Comparative Example 7 | 60 | 15 | — | 25 | 110 | 0.300 | 0.602 | 84.2 |

(H: $Y_3(Al, Ga)_5O_{12}$: Tb;
I: LaOCl: Tb;
J: $Zn_2SiO_4$: Mn;
K: $SrGa_2S_4$: Eu)

In Table 4), Luminance [1] represents the relative luminance when the luminance in Comparative Example is set to 100%.

Referring to Table 4, mixed phosphors of Examples 5 through 7 have excellent luminance persistence ratios, that is, greater than 90%, and have improved luminance and color purity compared to the conventional mixed phosphors of Comparative examples 3 and 4. If the content of the $Zn_2SiO_4$:Mn phosphor is increased so that the mixed phosphor of Comparative Examples 3 or 4 may have the same color purity as the mixed phosphor of Examples 5 through 7, the luminance and degradation characteristics became poorer than those of the mixed phosphors of Examples 5 through 7.

As the content of the $SrGa_2S_4$:Eu increases (Example 6 and Comparative examples 5 and 7), the luminance persistence ratio is lowered. Thus, a $SrGa_2S_4$:Eu phosphor content exceeding 20% by weight is not desirable, in view of the luminance persistence ratio. Also, when Examples 5 and 7 and Comparative example 6 are compared, as the content of the $Y_3(Al, Ga)_5O_{12}$:Tb decreases, the luminance thereof is lowered. Thus, the LaOCl:Tb phosphor content exceeding 20% by weight is not desirable, in view of luminance characteristics.

Since the afterglow characteristics of the $SrGa_2S_4$:Eu phosphor are much better than that of the $Zn_2SiO_5$:Mn phosphor, the mixed phosphors containing $SrGa_2S_4$:Eu phosphor (Examples 5 through 7) have a shorter afterglow time than the conventional mixed phosphors containing the $Zn_2SiO_4$:Mn phosphor (Comparative examples 3 and 4).

As described above, since the $SrGa_2S_4$:Eu phosphor has excellent luminance, color purity and degradation (service life) characteristics under the condition in which a high-density current is applied, compared to the conventional $Zn_2SiO_4$:Mn phosphor, a mixed green-emitting phosphor consisting of these phosphors in an appropriate mixture ratio have excellent luminosity characteristics. In other words, a mixed green-emitting phosphor composition consisting of a $Y_3(Al, Ga)_5O_{12}$:Tb phosphor, a LaOCl:Tb phosphor and a $SrGa_2S_4$:Eu phosphor not only has excellent degradation characteristics but also excellent color purity and luminance characteristics compared to the conventional mixed green-emitting phosphor containing a $Zn_2SiO_4$:Mn phosphor.

What is claimed is:

1. A green-emitting phosphor composition comprising: 5 to 50 wt % of a $SrGa_2S_4$:Eu phosphor and 50 to 95 wt % of a $Y_3 (Al, Ga)_5O_{12}$:Tb phosphor.

2. The green-emitting phosphor composition according to claim 1, wherein the content of the $SrGa_2S_4$:Eu phosphor is 7 to 20 wt % and the content of the $Y_3 (Al, Ga)_5O_{12}$:Tb phosphor is 80 to 93 wt %.

3. A green-emitting phosphor composition comprising: 5 to 20 wt % of a $SrGa_2S_4$:Eu phosphor, 60 to 90 wt % of a $Y_3 (Al, Ga)_5O_{12}$:Tb phosphor and 5 to 20 wt % of a LaOCl:Tb phosphor.

4. The green-emitting phosphor composition according to claim 3, wherein the content of the $SrGa_2S_4$:Eu phosphor is 10 to 15 wt %, the content of the $Y_3 (Al, Ga)_5O_{12}$:Tb phosphor is 70 to 85 wt % and the content of LaOCl:Tb phosphor is 5 to 15 wt %.

5. A cathode ray tube manufactured using a green-emitting phosphor composition as claimed in claim 1.

6. The cathode ray tube according to claim 5, wherein the cathode ray tube is of a projection type.

* * * * *